US011878466B2

(12) United States Patent
Mansell et al.

(10) Patent No.: US 11,878,466 B2
(45) Date of Patent: Jan. 23, 2024

(54) SEALING ASSEMBLIES

(71) Applicant: Hewlett-Packard Development Company, L.P., Spring, TX (US)

(72) Inventors: Rhys Owen Mansell, Sant Cugat del Valles (ES); Mohammad Jowkar, Sant Cugat del Valles (ES); Francesc Tarrida Tirado, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 17 days.

(21) Appl. No.: 15/734,572

(22) PCT Filed: Jan. 29, 2019

(86) PCT No.: PCT/US2019/015537
§ 371 (c)(1),
(2) Date: Dec. 3, 2020

(87) PCT Pub. No.: WO2020/159474
PCT Pub. Date: Aug. 6, 2020

(65) Prior Publication Data
US 2021/0347121 A1 Nov. 11, 2021

(51) Int. Cl.
*B29C 64/25* (2017.01)
*B33Y 30/00* (2015.01)
(Continued)

(52) U.S. Cl.
CPC .............. *B29C 64/25* (2017.08); *B22F 12/38* (2021.01); *B23Q 11/085* (2013.01);
(Continued)

(58) Field of Classification Search
CPC ......... B33Y 30/00; B33Y 40/00; B29C 64/20; B29C 64/30; B29C 64/364; B29C 64/25;
(Continued)

(56) References Cited

U.S. PATENT DOCUMENTS 789,773 A 5/1905 Wagenhorst
974,965 A 11/1910 Herman
(Continued)

FOREIGN PATENT DOCUMENTS

CA 2168678 C 7/2002
CN 206812441 U 12/2017
(Continued)

OTHER PUBLICATIONS

Richards, Keith L. (2018). Design Engineer's Sourcebook. CRC Press. Retrieved from https://app.knovel.com/hotlink/toc/id:kpDES00001/design-engineers-sourcebook/design-engineers-sourcebook (Year: 2018).*

(Continued)

*Primary Examiner* — Seyed Masoud Malekzadeh
*Assistant Examiner* — Jennifer L Groux
(74) *Attorney, Agent, or Firm* — Shook, Hardy & Bacon L.L.P.

(57) ABSTRACT

Example implementations relate to one or more than one sealing assembly to seal an aperture, coupling two chambers, the aperture being arranged to accommodate a printhead carriage; the assembly comprising: at least a pair of curtains capable of being disposed in a sealing relationship with the aperture; the at least a pair of curtains being capable of being positioned one either side of the printhead carriage, and spooling and unspooling mechanisms comprising a pair of spools onto which the pair of curtains can be spooled and unspooled in response to movement of the printhead carriage to maintain the sealing relationship with the aperture.

17 Claims, 15 Drawing Sheets

(51) Int. Cl.
*B29C 64/364* (2017.01)
*B22F 12/00* (2021.01)
*B29C 64/165* (2017.01)
*B23Q 11/08* (2006.01)

(52) U.S. Cl.
CPC .......... *B29C 64/165* (2017.08); *B29C 64/364* (2017.08); *B33Y 30/00* (2014.12)

(58) Field of Classification Search
CPC . B22F 12/00; B22F 12/38; B41J 29/12; B41J 29/13; B25J 19/0075; B23Q 11/085; B05B 16/40; E06B 9/08; E06B 9/11
See application file for complete search history.

(56) References Cited

U.S. PATENT DOCUMENTS

| | | | | |
|---|---|---|---|---|
| 1,199,942 | A * | 10/1916 | Taylor | G03B 21/06 353/67 |
| 4,061,219 | A * | 12/1977 | Nishikawa | B41J 2/285 400/229 |
| 5,067,285 | A * | 11/1991 | Hilbrands | B25J 19/0075 118/DIG. 7 |
| 5,235,874 | A * | 8/1993 | Tabellini | B23Q 11/085 384/15 |
| 6,739,248 | B2 | 5/2004 | Kolbe et al. | |
| 7,027,887 | B2 | 4/2006 | Gaylo et al. | |
| 7,686,995 | B2 | 3/2010 | Davidson et al. | |
| 8,153,182 | B2 * | 4/2012 | Comb | B29C 64/106 427/427 |
| 9,073,263 | B2 | 7/2015 | Mannella et al. | |
| 2004/0104515 | A1 * | 6/2004 | Swanson | B29C 64/40 264/497 |
| 2008/0192104 | A1 * | 8/2008 | Nye | B29C 64/209 347/110 |
| 2009/0295862 | A1 * | 12/2009 | Terada | B41J 2/16517 347/30 |
| 2011/0227999 | A1 * | 9/2011 | Tachibana | B41J 19/202 347/34 |
| 2013/0161439 | A1 | 6/2013 | Beery et al. | |
| 2016/0121550 | A1 | 5/2016 | Douglas et al. | |
| 2016/0332377 | A1 | 11/2016 | Lee et al. | |
| 2017/0210068 | A1 * | 7/2017 | Kunioka | B33Y 50/02 |
| 2019/0322048 | A1 * | 10/2019 | Huitema | B33Y 30/00 |

FOREIGN PATENT DOCUMENTS

| | | | | |
|---|---|---|---|---|
| DE | 711893 | C * | 3/1937 | .......... B23Q 11/085 |
| DE | 4213346 | C1 * | 5/1993 | .......... B23Q 11/085 |
| DE | 102004030770 | B3 * | 12/2005 | .......... B23Q 11/085 |
| JP | 2508187 | B2 * | 6/1996 | .......... B23Q 11/085 |
| WO | WO-9509697 | A1 * | 4/1995 | ......... B05B 13/0452 |
| WO | WO-WO2017112689 | A1 | 6/2017 | |
| WO | WO-2017196324 | A1 * | 11/2017 | .............. B22F 10/10 |
| WO | WO-2018109735 | A2 * | 6/2018 | .......... B29C 64/153 |
| WO | WO-2020058573 | A1 * | 3/2020 | .......... B29C 64/364 |

OTHER PUBLICATIONS

SU 889384 A1, Dec. 1981, Grinberg foreign reference and text translation (Year: 1981).*

* cited by examiner

SEALING ASSEMBLIES

BACKGROUND

Additive manufacturing is transforming classical part manufacturing processes, including removing many current limitations, leading to more complex geometries using a simpler manufacturing process.

Additive manufacturing printers and the build materials for additive manufacturing can present a harsh operating environment. Some of the parts of such printers operate with a high degree of precision that can be adversely affected by the harsh operating environment.

BRIEF DESCRIPTION OF THE DRAWINGS

Example implementations will now be described, by way of example, with reference to the accompanying drawings in which.

DETAILED DESCRIPTION

Figure 1:
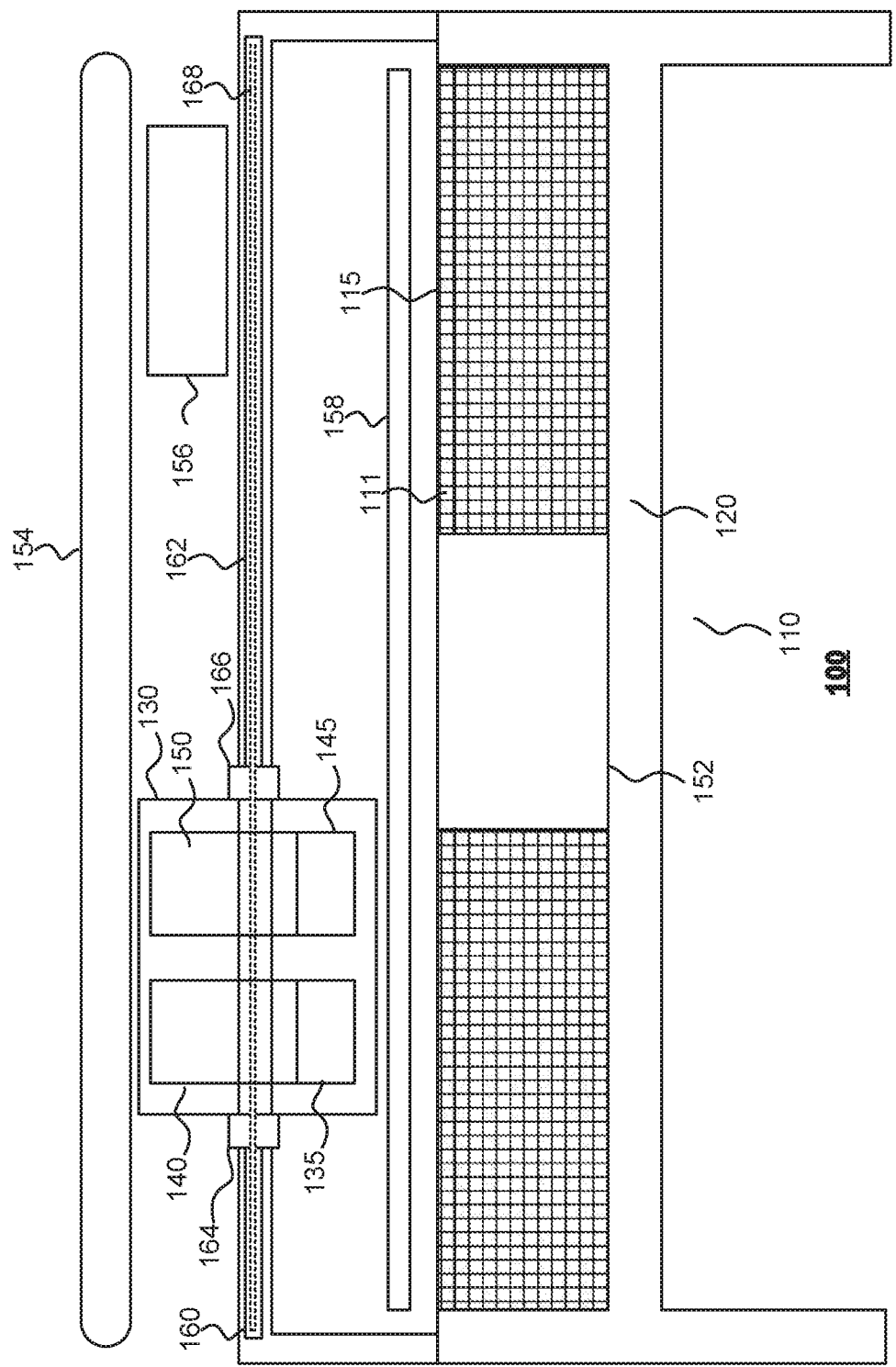
FIG. 1 is a schematic view of a 3-dimensional (3D) printing system according to example implementations.

FIG. 1 shows an example of a sectional view of a 3D printing system 100. The system 100 may include a removable build chamber 110 within which layers of build material 111 can be accumulated to form a build material bed 115. The build chamber 110 can alternatively form a fixed part of the system 100. The build material 111 can be, for example, a powder. In the example shown, the build chamber 110 has a build platform 120 bearing layers, or a volume, of build material to be selectively solidified to form each layer of a 3D object or part to be printed.

Examples of one or more build materials can comprise at least one of a polymer powder, or other plastic powder, a metal powder, a ceramic powder or other powder-like material, or lengths or units of such build material, taken jointly and severally in any and all permutations. The lengths or units of build material can comprise fibres or threads of build material. The fibres or threads of build material can be formed from, or otherwise derived from, longer or larger units of build material. The build material can be responsive to heat, or a binding agent, to fuse, or bind, adjacent particles of build material. For example, the build material to be fused can be defined with a printing liquid. The printing liquid can be arranged to couple heat to the build material to cause adjacent build material to fuse together. Additionally, or alternatively, the printing liquid may cause or influence chemical binding of the build material. Furthermore, the chemically bound build material can be subjected to heat to fuse the chemically bound build material together.

The system 100 can also comprise a printhead carriage 130 that has one or more than one inkjet pen for printing liquids. For example, the system 100 can provide a first inkjet pen 135 in communication with a first reservoir 140 of a first printing liquid. Example implementations can be realised in which the printing liquid is an energy absorbing fusing agent. The system can also provide a second inkjet pen 145. The second inkjet pen 145 can be in communication with a second reservoir 150 of a second printing liquid. Example implementations can be realised in which the second printing liquid can be a detailing agent.

At least one of the first and second inkjet pens 135 and 145 can be used to influence use of the build material to construct a 3D printed object 152. For example, the fusing agent printed via the pen 135 can define the build material to be fused.

After the fusing agent has been printed onto the layer of build material, a heater such as, for example, a fusing lamp 154, can be used to heat the build material. Build material bearing fusing agent absorbs more energy than build material without fusing agent such the former agglomerates whereas the latter does not fuse. The fusing lamp 154 is an example implementation of a heat source.

The detailing agent can be used to improve the definition between fused and unfused portions of build material during heating. The detailing agent is printed onto build material intended to remain unfused that is adjacent to build material intended to be fused. The detailing agent influences the temperature of the build material onto which it is printed to inhibit fusing of that build material. The detailing agent can constrain thermal bleed, that is, it can constrain the inadvertent spread of heat to build material intended to remain unfused.

To achieve good selectivity between the fused and unfused portions of a build material layer, the fusing agent can absorb enough energy to increase the temperature of any build material coated or printed with the fusing agent above the melting or softening point of the build material, while unprinted portions of the layer of build material remain below the melting or softening point.

A controller 156 controls the operation of the 3D printer 100. The controller 156 can comprise one or more than one processor for executing machine-readable or machine-executable instructions for realizing any and all examples herein. Accordingly, examples provide at least one or more than one of circuitry, hardware or software for implementing such a controller 156, taken jointly and severally in any and all permutations to implement or execute any such instructions. The controller 156 is arranged to implement any control and/or any methods described herein.

The build material 111 is deposited via a recoater 158. The recoater 158 is arranged to deposit a layer of build material, such as layer 111, during a traversal of the build platform 120. Layer 111 is an example of such a layer of build material. The recoater 158 moves in a reciprocating manner depositing build material in a direction normal to the plane of FIG. 1.

The printer 100 also comprises at least a pair of curtains 160 and 162 together with respective spooling and unspooling mechanisms 164 and 166. The respective spooling and unspooling mechanisms 164 and 166 are arranged to spool and unspool the curtains 160 and 162 in response to movement of the printhead carriage 130. The curtains 160 and 162 maintain a seal over an aperture 168. The aperture 168 extends in the directions of movement of the carriage. Although example implementations have been described with reference to sealing an aperture through which a printhead carriage extends, example implementations can be realized in which such an aperture can be sealed through which any type of conveyance or carriage extends as opposed to being limited to printhead carriages. The carriage or conveyance can be arranged to carry, for example, an arm, or other member that is operable within one environment, but that is controlled, or at least moved, within another environment.

Example implementations can be realised in which the curtains are fabricated, or manufactured, from a deformable material. The deformable material can be a resiliently deformable material. Example implementations can be realised in which a curtain comprises at least one of a metal curtain biased towards a wound state or an unwound state, a plastic curtain, a web, a foil, a net or a fabric.

Figure 2:
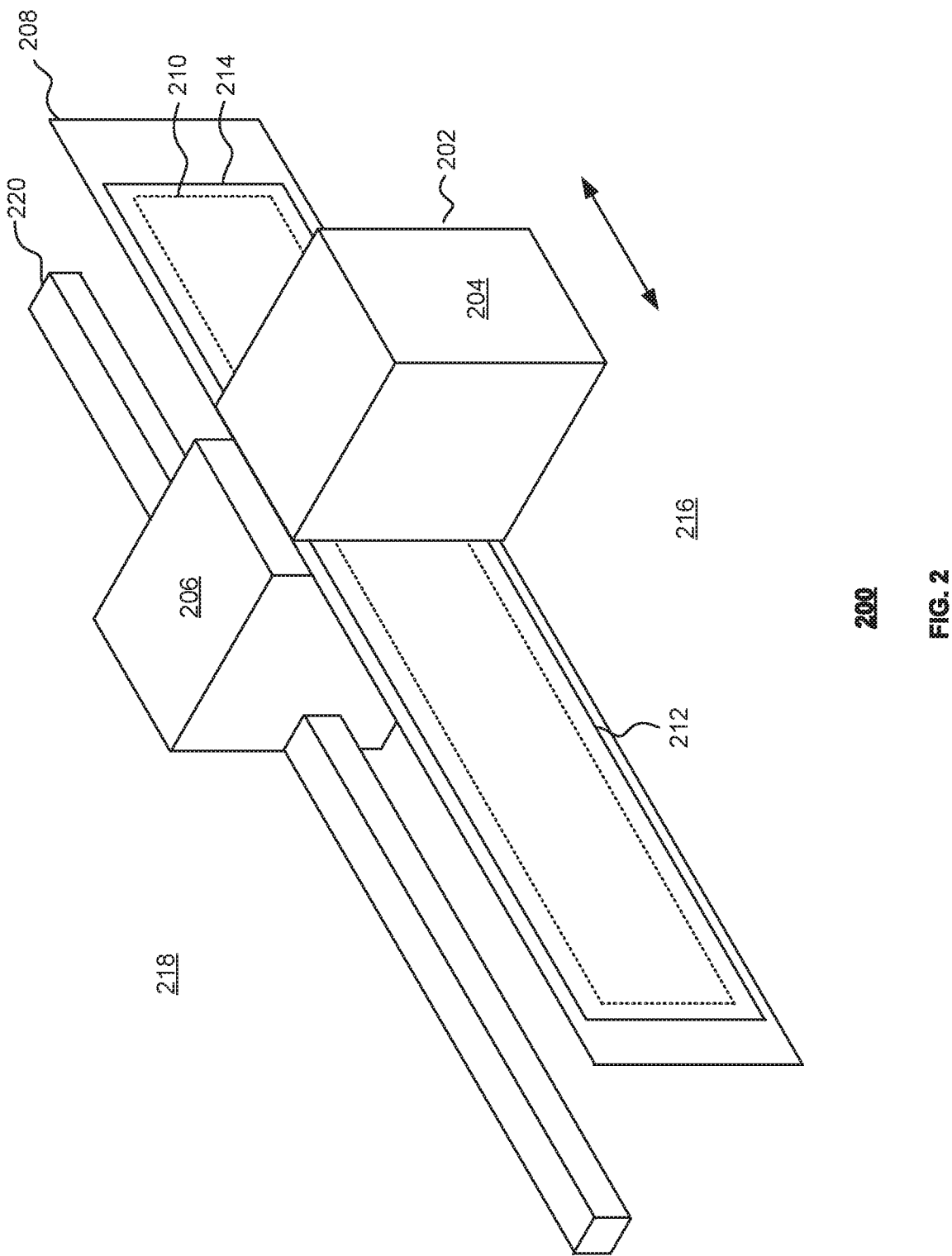
FIG. 2 shows a view of a portion of the 3D printing system according to example implementations.

Referring to FIG. 2, there is shown a view 200 of a portion of the 3D printer 100. The portion of the 3D printer comprises a printhead carriage 202 such as the above-described printhead carriage. The printhead carriage 202 comprises first 204 and second 206 portions that are disposed either side of a divide or barrier 208. The divide or barrier 208 comprises an aperture 210 to accommodate a portion of the printhead carriage that connects the first 204 and second 206 portions of the overall printhead carriage 202. The aperture 210 is sealed using first and second curtains 212 and 214. The first 212 and second 214 curtains provide a seal between the regions or volumes 216 and 218 either side of the divide 208. The curtains 212 and 214 provide such a seal while the printhead carriage 202 moves in a reciprocating manner printing, for example, the 3D printed object 152. The curtains 212 and 214 are examples of the above-described curtains 160 and 162.

The first 204 portion of the printhead carriage 202 comprises a number of printheads (not shown). The printheads can print liquid onto the build material bed 115 such as at least one, or both, of the above fusing agent or detailing agent. The build material bed 115 can comprise, for example, the powder. The heat lamp 154 can be used to heat any powder treated with the detailing or fusing liquid. The re-coater 158 is used to deposit the powder onto the build material bed 115. Consequently, the region 216 is a relatively polluted or dirty region.

In contrast, the other region 218 is a relatively unpolluted or clean region, especially relative to the first region 216. The second portion 206 of the printhead carriage 202 comprises a drive (not shown) that is associated with a rail 220. The rail 220 is used to control movement of the printhead carriage 202 and, in particular, is used to realise very precise positioning of the printhead carriage 202. It can be appreciated that powder from the unclean region 216 could, if it crosses the barrier 208, and in particular, if there is an ineffective seal between the first region 216 and the second region 220, interfere with or otherwise clog the rail 220. Any adverse impact of the powder on the rail 220 could have negative consequences for the correct operation, movement or positioning of the printhead carriage 202 using the rail 220. For example, the precision with which the movement of the printhead carriage 202 can be controlled or positioned could interfere with, or otherwise adversely impact, manufacture of the 3D printed object 152.

Therefore, as the printhead carriage 202 moves, the curtains 212 and 214 are maintained in a sealing relationship with the barrier 208 to ensure that the aperture 210 remains sealed notwithstanding movement of the printhead carriage 202.

Figure 3:
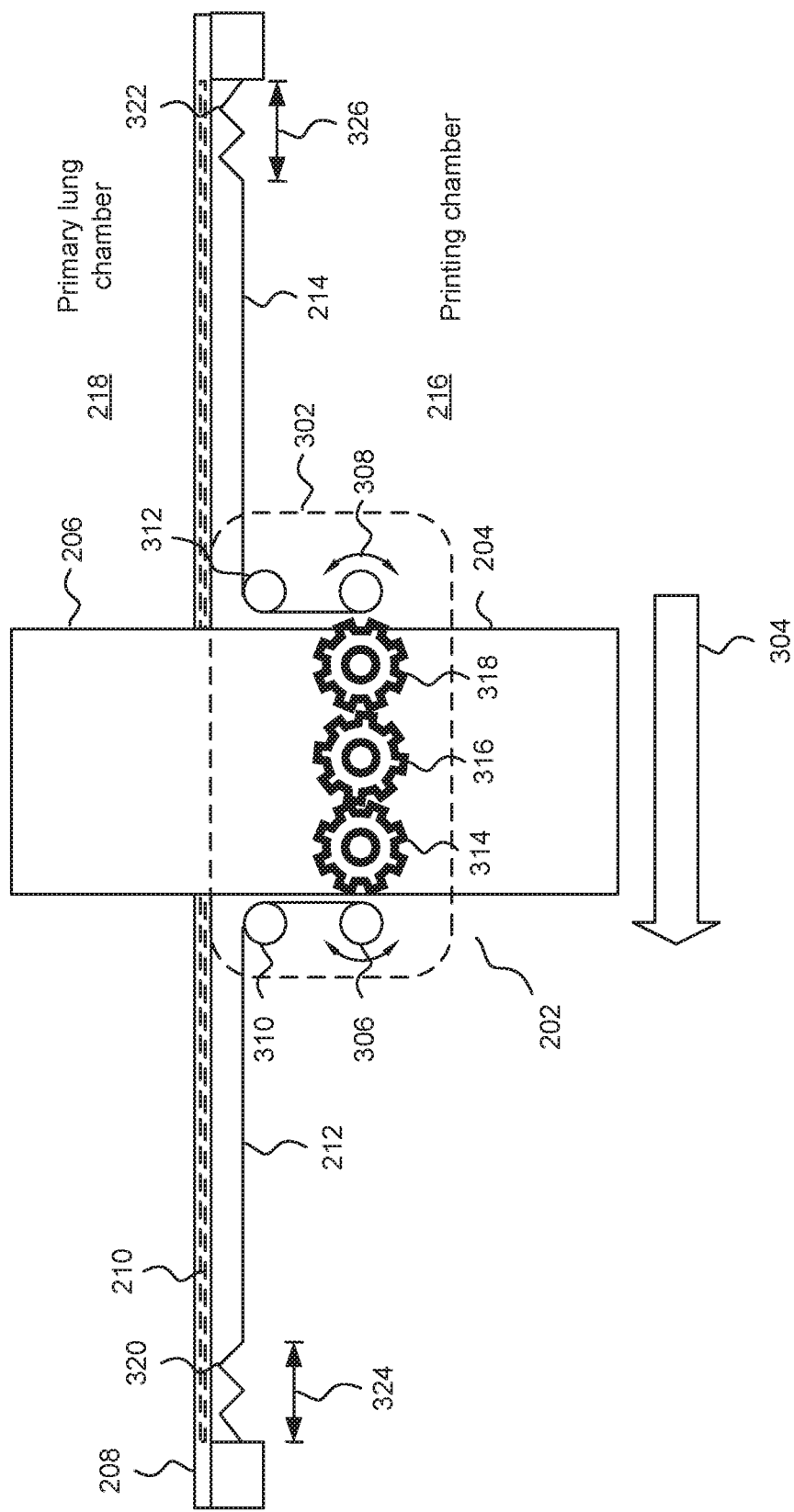
FIG. 3 illustrates a view of a portion of the 3D printing system according to example implementations.

Referring to FIG. 3, there is shown a plan view 300 of the printhead carriage 202, the first 204 and second 206 portions of the printhead carriage, the barrier or divide 208 and the pair of sealing curtains 212 and 214 according to an example implementation. Also shown in FIG. 3 is a spooling and unspooling mechanism 302. The spooling and unspooling mechanism 302 is an example of the above-described spooling and unspooling mechanisms 164 and 166. The spooling and unspooling mechanism 302 is arranged to spool one curtain while concurrently unspooling the other curtain of the curtains 212 and 214 and vice versa according to the direction of travel of the printhead carriage 202. In the indicated example, the printhead carriage 202 is travelling from right to left as indicated by the arrow 304. Therefore, the spooling and unspooling mechanism 302 will spool, that is, wind in or otherwise gather up, the left hand curtain 212, and concurrently unspool, that is, otherwise wind or let out, the second curtain 214.

The spooling and unspooling mechanism 302 is arranged to spool and unspool the curtains 212 and 214 in such a manner that the curtains 212 and 214 are maintained in a sealing relationship with the aperture 210 at least to reduce or to prevent debris or other pollutants within the first region 216 from entering the second region 218. Example implementations can be realised in which the first region is known as a printing chamber and the second region is known as a lung or lung chamber.

Referring more closely to the spooling and unspooling mechanism 302, it can be appreciated that at least one spool is provided per curtain. Therefore, the example implementation shown in FIG. 3 has a first spool 306 corresponding to the first curtain 212 and a second spool 308 corresponding to the second curtain 214. Optionally, a guide roller can also be provided on a per curtain basis. Therefore, the example implementation shown provides a first guide roller 310 associated with the first curtain 212 and a second guide roller 312 associated with the second curtain 214. The first 310 and second 312 guide rollers are used to assist in maintaining the respective curtains 212 and 214 in a sealing relationship relative to the aperture 210.

The spooling and unspooling mechanism 302 is arranged to operate the first 306 and second 308 spools synchronously. In the example implementation depicted, the first 306 and second 308 spools are mechanically coupled. An example of the mechanical coupling is illustrated in the form of cogs or gears 314, 316, 318. The cogs or gears are example implementations of a geared arrangement. The outer most cogs or gears 314 and 318 are mechanically coupled to the first 306 and second 308 spools.

Therefore, it can be appreciated that moving the printhead carriage 202 in the direction of the arrow 304 indicated, will increase the tension in the second curtain 214 that, in turn, will cause the second spool 308 to rotate as it deploys or unspools any spooled portions of the curtain 214. That rotation will cause the associated cogs or gears 318, 316 and 314 to rotate. Rotation of those cogs or gears 318, 316 and 314 will cause the first spool 306 to rotate in such a manner as to cause the first spool 306 to spool, or otherwise gather in, the first curtain 212.

Conversely, when the printhead carriage 202 is moved in the opposite direction to arrow 304, the tension generated in the first curtain 212 will cause the first spool 306 to rotate in an anti-clockwise direction such that any spooled portions of first curtain 212 start to unspool. Rotation of the first spool 306 will cause corresponding rotations of the cogs or gears 314, 316, 318. Rotation of cog or gear 318, as a consequence of rotation of the first spool 306, will cause the second spool 308 to spool, or otherwise gather, portions of the second curtain 214 by rotating the second spool 308 in an anti-clockwise direction.

Therefore, as the carriage moves in a reciprocating manner the curtains 212 and 214 are synchronously spooled and unspooled so as to maintain the curtains 212 and 214 in a sealing relationship with the aperture 210. Providing such a sealing relationship prevents or at least reduces, contaminants, powder, particulates or other pollutants from travelling from the first region 216 to the second region 218.

The curtains 212 and 214 can be coupled to the barrier 208 via respective resiliently or elastically deformable members 320 and 322. Example implementations of the elastically deformable members can comprise respective springs. The deformable members 320 and 322 are arranged to keep the curtains 212 and 214 under sufficient tension during spooling and unspooling to maintain the curtains in a sealing relationship with the aperture 210. Furthermore, as the deformable members 320 and 322 respond to the respective curtains being spooled and unspooled, each will undergo a change in length that gives rise to respective stroke lengths 324 and 326. The respective stroke lengths 324 and 326 should be arranged to maintain the curtains in a sealing relationship with the aperture 210 during both spooling and unspooling of the curtains.

Figure 4:
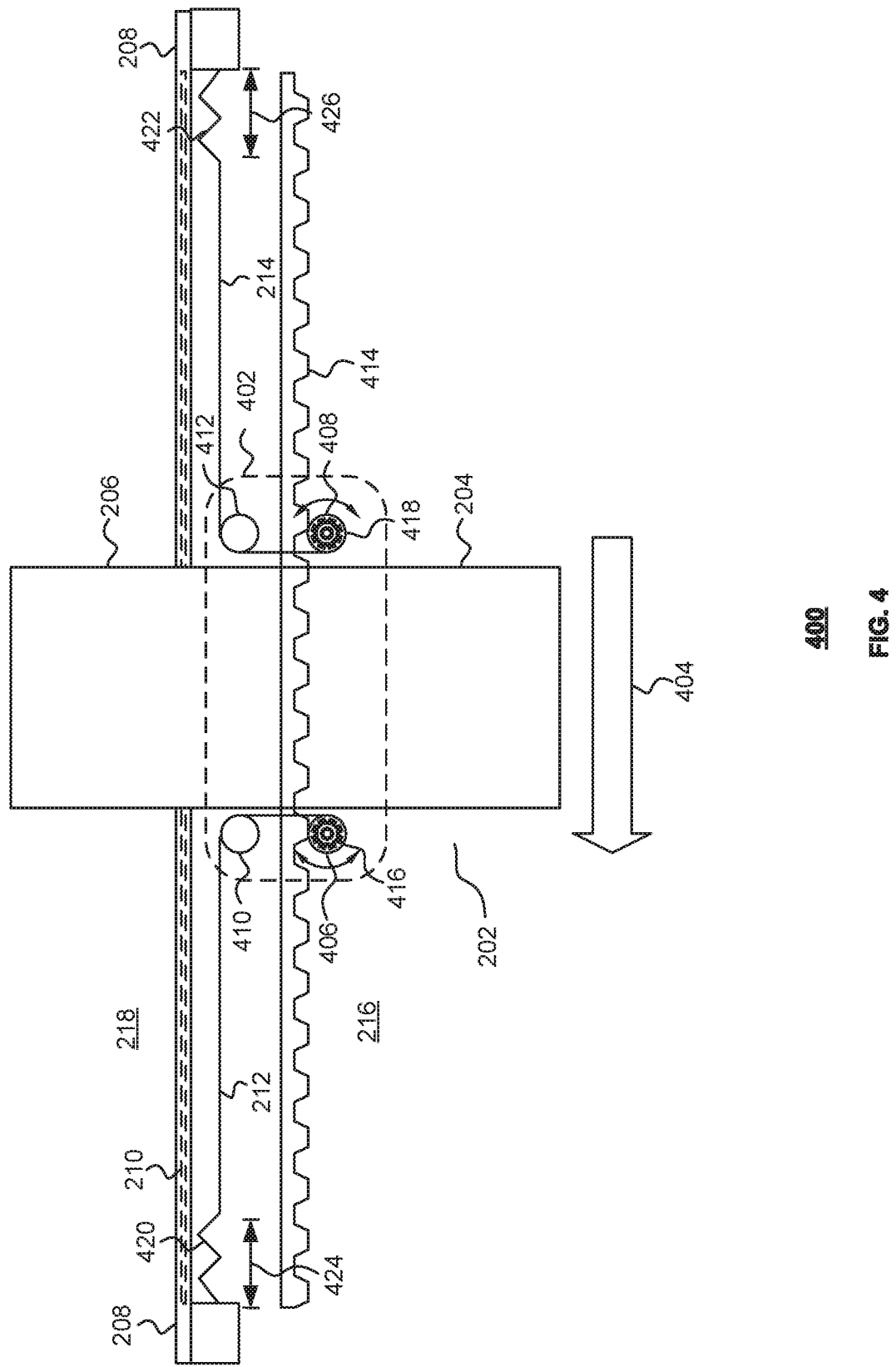
FIG. 4 depicts a view of a portion of the 3D printing system according to example implementations.

Referring to FIG. 4, there is shown a plan view 400 of the printhead carriage 202, the first 204 and second 206 portions of the printhead carriage, the barrier or divide 208 and the pair of sealing curtains 212 and 214 according to an example implementation. Also shown in FIG. 4 is a spooling and unspooling mechanism 402. The spooling and unspooling mechanism 402 is an example of the above-described spooling and unspooling mechanism 164 and 166. The spooling and unspooling mechanism 402 is arranged to spool one curtain while concurrently unspooling the other curtain of the curtains 212 and 214 and vice versa according to the direction of travel of the printhead carriage 202. In the indicated example, the printhead carriage 202 is travelling from right to left as indicated by the arrow 404. Therefore, the spooling and unspooling mechanism 402 will spool, that is, wind in or otherwise gather up, the left hand curtain 212, and concurrently unspool, that is, otherwise wind or let out, the second curtain 214.

The spooling and unspooling mechanism 402 is arranged to spool and unspool the curtains 212 and 214 in such a manner that the curtains 212 and 214 are maintained in a sealing relationship with the aperture 210 to prevent debris or other pollutants within the first region 216 from entering the second region 218. Example implementations can be realised in which the first region is known as a printing chamber and the second region is known as a lung or lung chamber.

Referring more closely to the spooling and unspooling mechanism 402, it can be appreciated that at least one spool is provided per curtain. Therefore, the example implementation shown in FIG. 4 has a first spool 406 corresponding to the first curtain 212 and a second spool 408 corresponding to the second curtain 214. Optionally, a guide roller can also be provided on a per curtain basis. Therefore, the example implementation shown provides a first guide roller 410 associated with the first curtain 212 and a second guide roller 412 associated with the second curtain 214. The first 410 and second 412 guide rollers are used to assist in maintaining the respective curtains 212 and 214 in a sealing relationship relative to the aperture 210.

The spooling and unspooling mechanism 402 is arranged to operate the first 406 and second 408 spools synchronously. In the example implementation depicted, the first 406 and second 408 spools are mechanically coupled. The mechanical coupling is realised in the form of rack 414 and pinions 416 and 418. The rack 414 comprises a plurality of teeth that are arranged to cooperate with corresponding pinion teeth of the pinions 416 and 418 disposed on the first and second spools 406 and 408.

Therefore, it can be appreciated that moving the printhead carriage 202 in the direction of the arrow 404 indicated, will cause the first 406 and second 408 spools to rotate concurrently to spool and unspool unspooled and spooled portions of the first 212 and second 214 curtains respectively. The spools will rotate in a clockwise direction.

Conversely, when the printhead carriage 202 moves in the opposite direction to arrow 404, the rack and pinions 414, 416, 418 will cause the first spool 406 to rotate in an anti-clockwise direction such that any spooled portions of first curtain 212 start to unspool. Concurrently, such printhead carriage movement will cause the second spool 408 to spool, or otherwise gather, portions of the second curtain 214 by rotating the second spool 408 in an anti-clockwise direction.

The curtains 212 and 214 can be coupled to the barrier 208 via respective resiliently or elastically deformable members 420 and 422. Example implementations of the elastically deformable members can comprise respective springs. The deformable members 420 and 422 are arranged to keep the curtains 212 and 214 under sufficient tension during spooling and unspooling to maintain the curtains in a sealing relationship with the aperture 210. Furthermore, as the deformable members 420 and 422 respond to the respective curtains being spooled and unspooled, each will undergo a change in length that gives rise to respective stroke lengths 424 and 426. The respective stroke lengths 424 and 426 should be arranged to maintain the curtains in a sealing relationship with the aperture 210 during both spooling and unspooling of the curtains.

Therefore, as the carriage moves in a reciprocating manner, the curtains 212 and 214 are synchronously spooled and unspooled to maintain the seal with the aperture 210. Providing such a seal prevents or at least reduces, contaminants, powder, particulates or other pollutants from travelling from the first region 216 to the second region 218.

Figure 5:
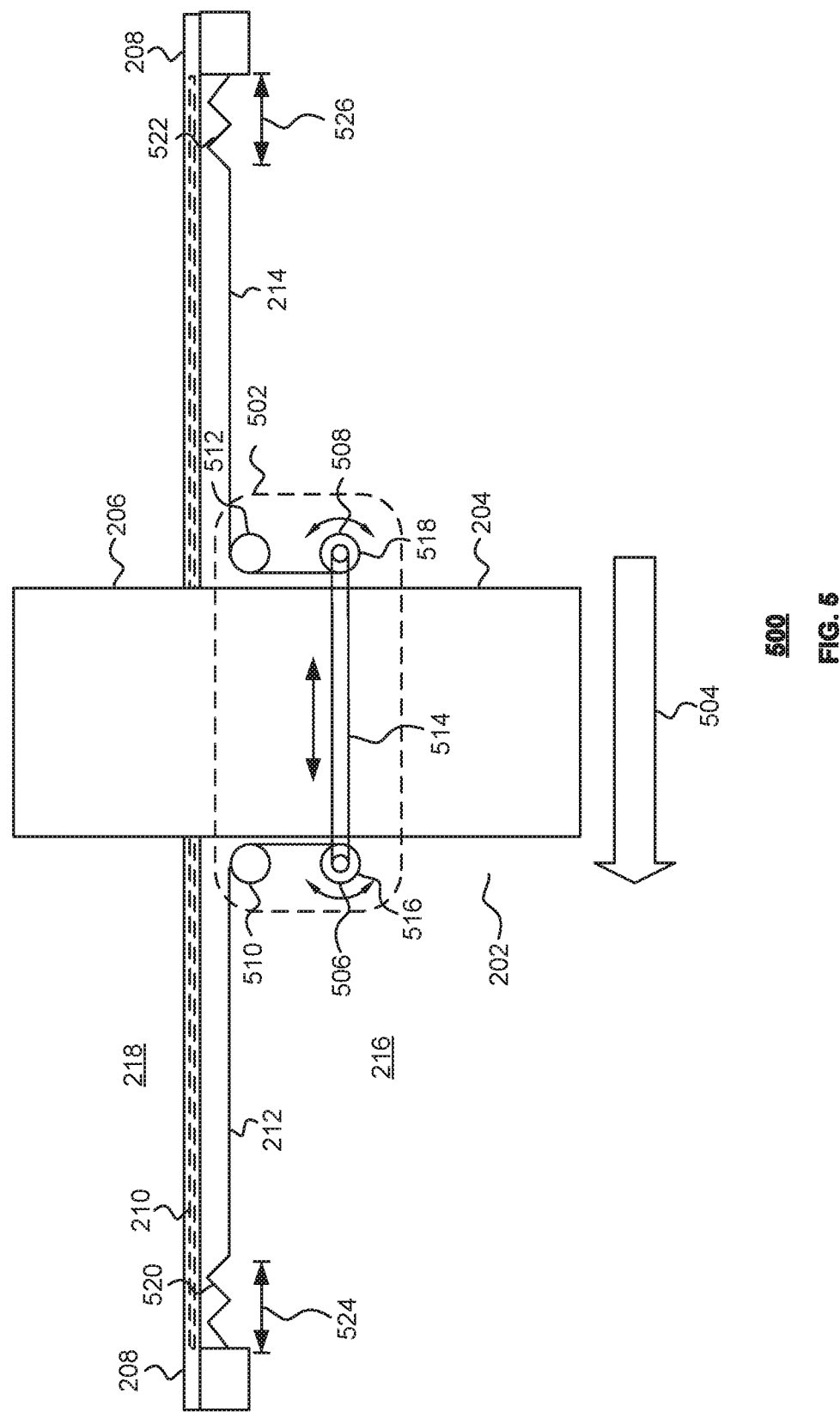
FIG. 5 shows a view of a portion of the 3D printing system according to example implementations.

Referring to FIG. 5, there is shown a plan view 500 of the printhead carriage 202, the first 204 and second 206 portions of the printhead carriage, the barrier or divide 208 and the pair of sealing curtains 212 and 214 according to an example implementation. Also shown in FIG. 5 is a spooling and unspooling mechanism 502. The spooling and unspooling mechanism 502 is an example of the above-described spooling and unspooling mechanism 164 and 166. The spooling and unspooling mechanism 502 is arranged to spool one curtain while concurrently unspooling the other curtain of the curtains 212 and 214 and vice versa according to the direction of travel of the printhead carriage 202. In the indicated example, the printhead carriage 202 is travelling from right to left as indicated by the arrow 504. Therefore, the spooling and unspooling mechanism 502 will spool, that is, wind in or otherwise gather up, the left hand curtain 212, and concurrently unspool, that is, otherwise wind or let out, the second curtain 214. The spooling and unspooling mechanism 502 is arranged to spool and unspool the curtains 212 and 214 in such a manner that the curtains 212 and 214 are maintained in a sealing relationship with the aperture 210 to prevent debris or other pollutants within the first region 216 from entering the second region 218. Example implementations can be realised in which the first region is known as a printing chamber and the second region is known as a lung or lung chamber.

Referring more closely to the spooling and unspooling mechanism 502, it can be appreciated that at least one spool is provided per curtain. Therefore, the example implementation shown in FIG. 5 has a first spool 506 corresponding to the first curtain 212 and a second spool 508 corresponding to the second curtain 214. Optionally, a guide roller can also be provided on a per curtain basis. Therefore, the example implementation shown provides a first guide roller 510 associated with the first curtain 212 and a second guide roller 512 associated with the second curtain 214. The first 510 and second 512 guide rollers are used to assist in maintaining the respective curtains 212 and 214 in a sealing relationship relative to the aperture 210.

The spooling and unspooling mechanism 502 is arranged to operate the first 506 and second 508 spools synchronously. In the example implementation depicted, the first 506 and second 508 spools are mechanically coupled. The mechanical coupling is realised in the form of belt 514. The belt 514 is arranged to cooperate with corresponding rollers 516 and 518 disposed on the first and second spools 506 and 508. The belt 514 and rollers 516 and 518 can comprise cooperating formations such as, for example, teeth or a sprocket, and a corresponding chain, to influence the timing of the rotation of the spools 506 and 508. Such a belt, or chain, can be an implementation of a timing belt. Alternatively, the belt 514 can be frictionally coupled to the spools 506 and 508 via respective camming or drive surfaces that rotate the spools 506 and 508.

Therefore, it can be appreciated that moving the printhead carriage 202 in the direction of the arrow 504 indicated, will cause the first 506 and second 508 spools to rotate concurrently to spool and unspool unspooled and spooled portions of the first 212 and second 214 curtains respectively. The spools will rotate in a clockwise direction.

Conversely, when the printhead carriage 202 moves in the opposite direction to arrow 504, the belt 514 and rollers 516 and 518 will cause the first spool 506 to rotate in an anti-clockwise direction such that any spooled portions of first curtain 212 start to unspool. Concurrently, such printhead carriage movement will cause the second spool 508 to spool, or otherwise gather, portions of the second curtain 214 by rotating the second spool 508 in an anti-clockwise direction.

The curtains 212 and 214 can be coupled to the barrier 208 via respective resiliently or elastically deformable members 520 and 522. Example implementations of the elastically deformable members can comprise respective springs.

The deformable members 520 and 522 are arranged to keep the curtains 212 and 214 under sufficient tension during spooling and unspooling to maintain the curtains in a sealing relationship with the aperture 210. Furthermore, as the deformable members 520 and 522 respond to the respective curtains being spooled and unspooled, each will undergo a change in length that gives rise to respective stroke lengths 524 and 526. The respective stroke lengths 524 and 526 should be arranged to maintain the curtains in a sealing relationship with the aperture 210 during both spooling and unspooling of the curtains.

Therefore, as the printhead carriage 202 moves in a reciprocating manner, the curtains 212 and 214 are synchronously spooled and unspooled to maintain the seal over the aperture 210. Providing such a seal prevents or at least reduces, contaminants, powder, particulates or other pollutants from travelling from the first region 216 to the second region 218.

Figure 6:
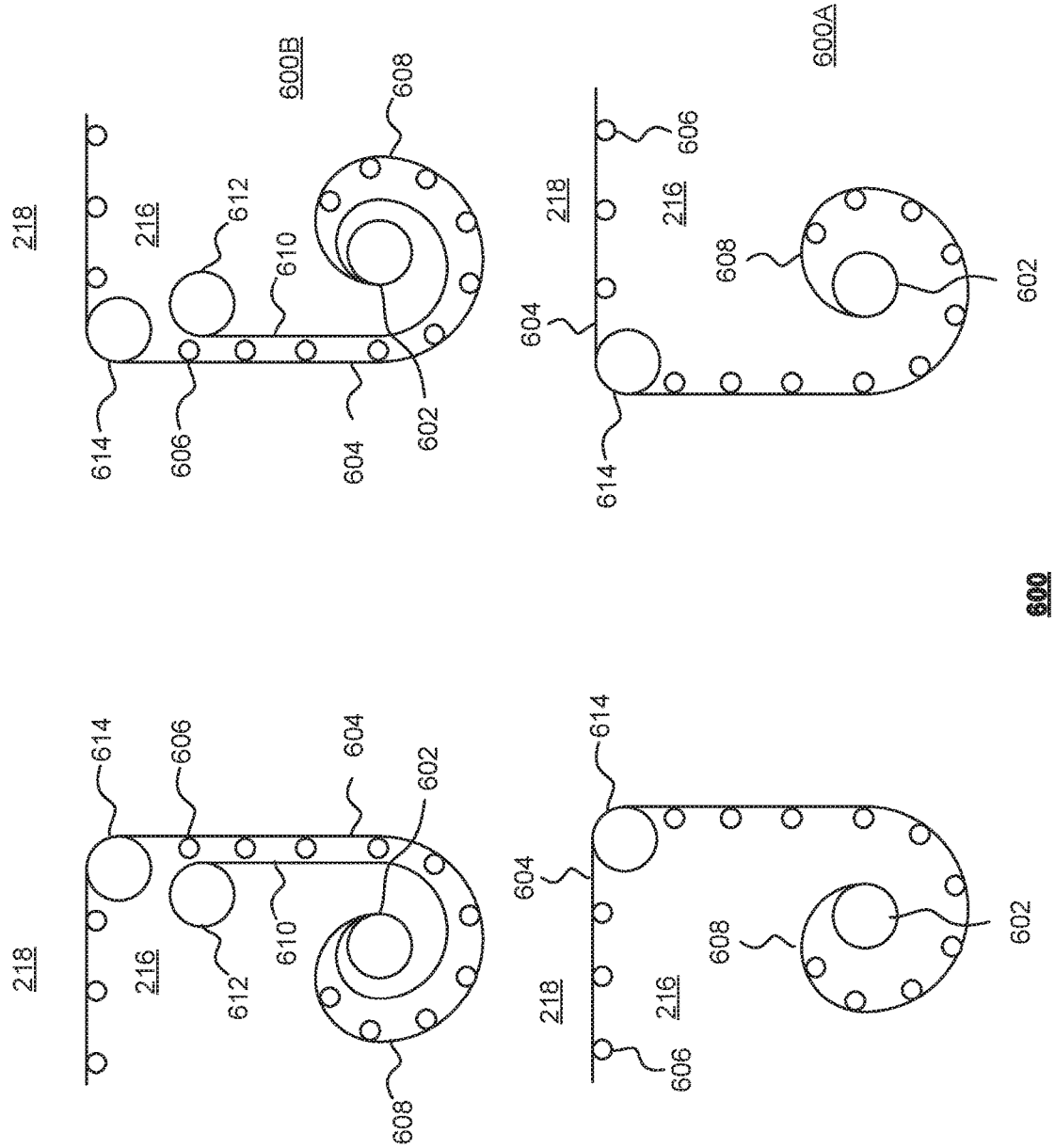
FIG. 6 illustrates curtain arrangements according to example implementations.

Referring to FIG. 6, there is shown a pair of views 600A and 600B of example implementations of the curtains and spooling and unspooling mechanisms. Referring to view 600A, there is shown a spool 602 bearing a curtain 604. The curtain 604 can be at least one, or either of, the first 212 and second 214 curtains described in any of the example implementations in the present application.

It can be appreciated that the curtain 604 is exposed to both the lung chamber 218 and the printing chamber 216. The printing chamber 216 is unclean, that is, it bears powder, particulates, contaminants, or other pollutants 606 within the atmosphere. The powder, particulates, contaminants, or other pollutants 606 can arise from, or be related to, the build material. Such powder, particulates, contaminants, or other pollutants 606 can adhere to the curtains 604. It can be appreciated that on spooling the curtain 604 onto the spool 602 the polluted side, that is, the side of the curtain 604 bearing the particulates 606, can come into contact with the clean side 608 of the curtain 604. Therefore, on unspooling from the spool 602 there is a risk that the particulates 606 will adhere to the clean side 608 of the curtain 604 and, ultimately, be exposed to, or be free to pollute, the lung chamber 218.

A yet further spool or guide roller 614 can be provided that is arranged to urge the curtain 604 into a sealing relationship with the aperture (not shown).

Referring to view 600B, there is shown a spool 602 bearing a curtain 604. The curtain 604 can be at least one, either or both of, the first 212 and second 214 curtains described in any of the example implementations in the present application.

It can be appreciated that the curtain 604 is exposed along part of its length to both the lung chamber 218 and the printing chamber 216. The printing chamber is unclean, that is, it bears powder, particulates or other pollutants 606 within the atmosphere. The powder, particulates or other pollutants 606 can arise from or be related to the build material. Such powder, particulates or other pollutants 606 can adhere to the curtain 604. It can be appreciated that on spooling the curtain 604 onto the spool 158 the polluted side, that is, the side of the curtain 604 bearing the particulates 606, could come into contact with the clean side 608 of the curtain 604. Therefore, on unspooling from the spool 602 there would be a risk that the powder, particulates or other pollutants 606 would be carried by the clean side 608 of the curtain 604 and, ultimately, be exposed to, or be free to pollute, the lung chamber 218. Therefore, example implementations provide a further curtain 610, held on a further spool 612, that is arranged to overlap with the curtain 604 such that the further curtain prevents, or at least reduces, powder, particulates or other pollutants 606 on the polluted side of the curtain 604 from coming into contact with the clean side 608 of the curtain 604. The spools 602 and 612 can be arranged to operate synchronously using any of the spooling and unspooling mechanisms described in this application, or any other arrangement for synchronizing the spools 602 and 612. The further curtain 610 is an example implementation of a protective curtain that is arranged or used to protect one side of another curtain from pollutants on the other side of that curtain.

A yet further spool or guide roller 614 can be provided that is arranged to urge the curtain 604 into a sealing relationship with the aperture (not shown).

Figure 7:
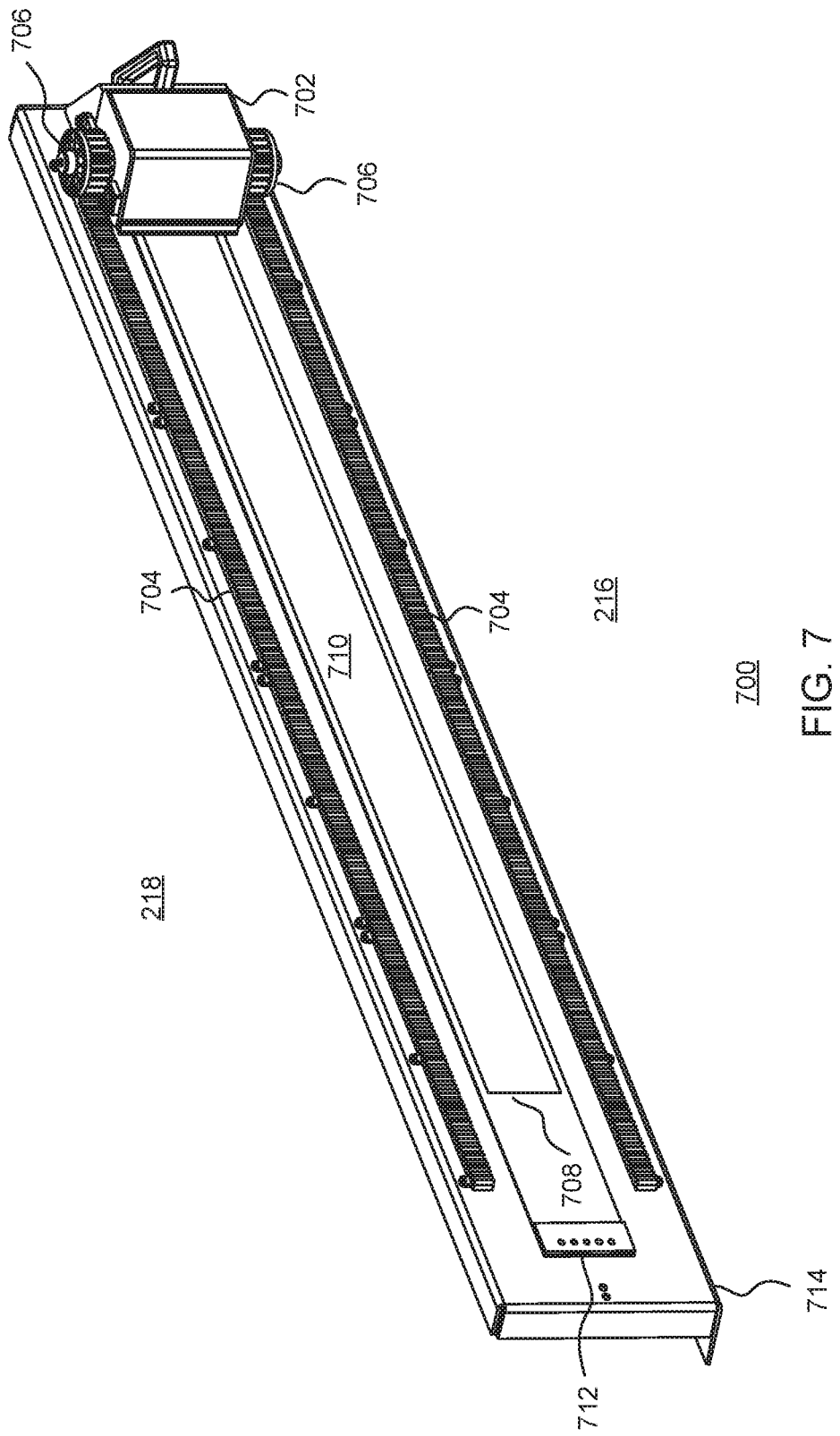
FIG. 7 depicts a portion of the 3D printing system according to example implementations.

Referring to FIG. 7, there is shown a view 700 of an example implementation of a spool (not shown) contained within a housing 702 viewed from the first region 216. The spool can be an example of any spool described herein. The spool has, or cooperates with, a rack and pinion 704 and 706. The rack and pinion 704 and 706 comprises a pair of racks 704 disposed either side of an aperture 708 that is covered by a curtain 710. The racks 704 are arranged to cooperate with the pinions 706 to rotate the spool (not shown) contained within the housing 702 according to the direction of movement of the housing. The curtain 710 is anchored at one end 712 of the aperture or plane, or other structure, 714 in which the aperture 708 is formed. As the housing 702, which can represent the printer carriage 202 described above, moves from right to left, the spool (not shown) contained within the housing 702 rotates clockwise and, therefore, spools the curtain 710 onto the spool (not shown). Conversely, as the housing 702 moves from left to right, the pinions 706, in cooperation with the racks 704, rotate the spool (not shown) anti-clockwise to unspool the curtain 710.

Figure 8:
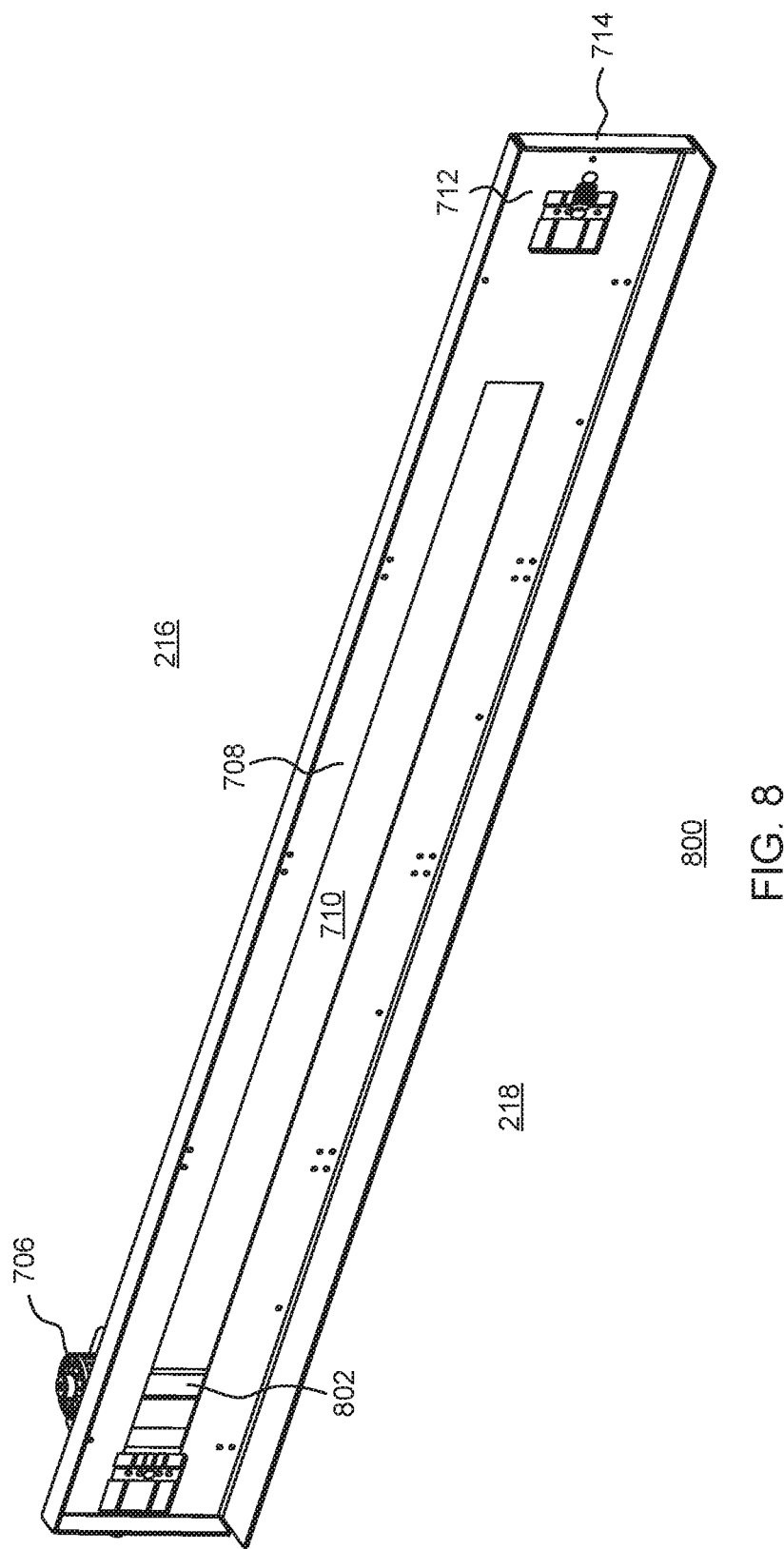
FIG. 8 shows an alternative view of the portion of the 3D printing system shown in FIG. 7 according to example implementations.

Referring to FIG. 8, there is shown a view 800 of the example implementation described with reference to FIG. 7 viewed from the second region. It can be seen that the curtain 710 forms a seal with the aperture 708. Furthermore, the curtain 710 can be anchored at one end 712. The pinion 706 is arranged to rotate the spool 802 that is now visible through the aperture 708.

Figure 9:
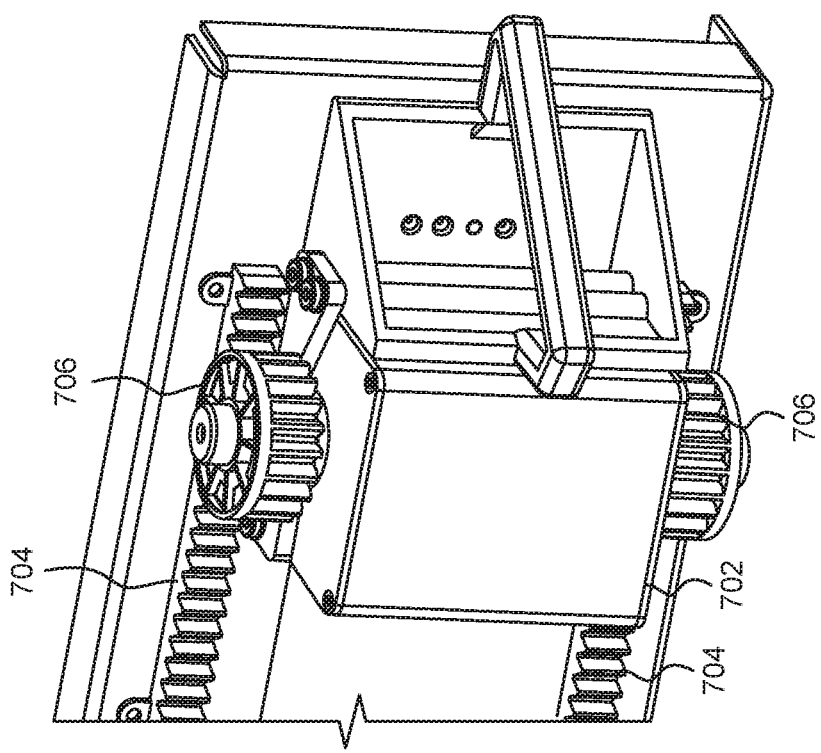
FIG. 9 illustrates a portion of the 3D printing system of FIG. 7 according to example implementations.

Referring to FIG. 9, there is shown a close-up view 900 of the housing 702, the racks 704 and the pinions 706.

Figure 10:
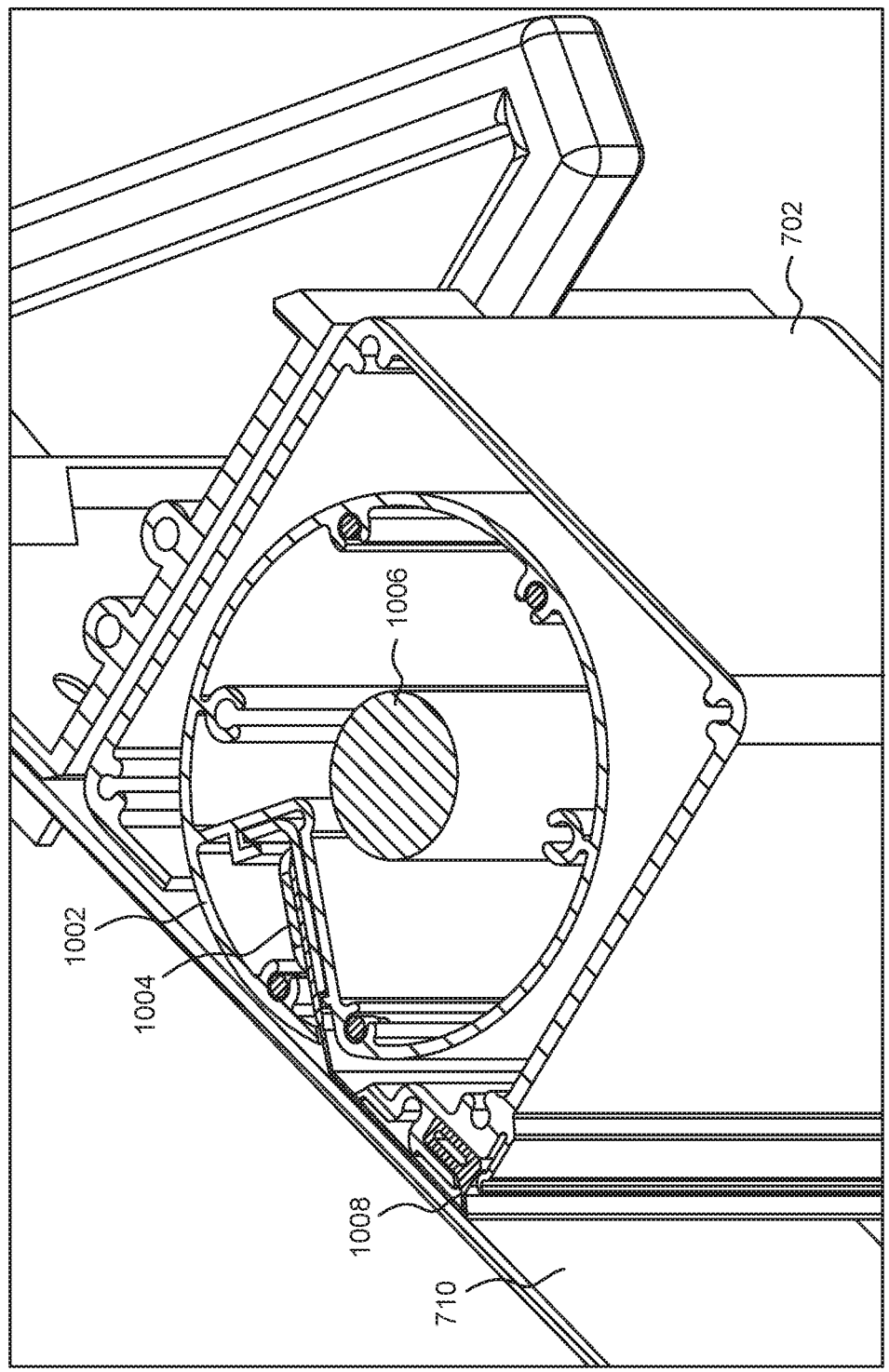
FIG. 10 depicts a sectional view of the portion of the 3D printing system of FIG. 7 according to example implementations.

Referring to FIG. 10, there is shown a sectional view 1000 of the housing 702 containing a spool 1002. The spool 1002 can be an example of any spool described herein. It can be appreciated that the curtain 710 is connected to the spool via a curtain anchor 1004. The spool 1002 comprises a central spindle 1006 about which the spool rotates. The central spindle 1006 is connected to the pinions 706 (not shown). A biased member 1008 is provided to urge the curtain into a sealing relationship with the aperture 708, or, more particularly, with the material defining the aperture. The biasing member 1008 can be made from an elastically deformable material. The biasing member 1008 can also operate as a cleaner or scraper intended to remove powder or particulates from the curtain 710 prior to spooling the curtain 710, which will reduce the risk of polluting the clean side of the curtain.

Figure 11:
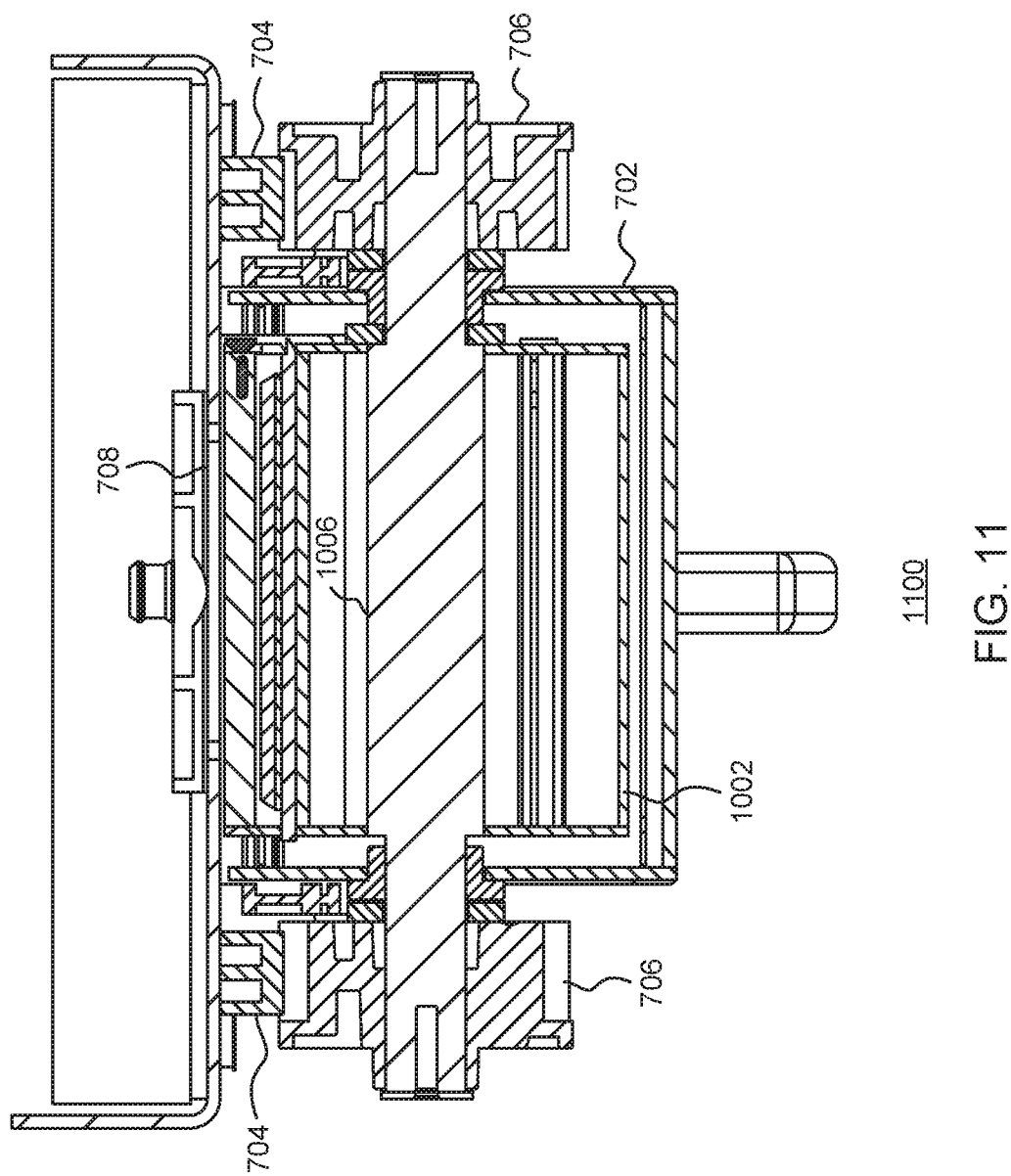
FIG. 11 shows a further sectional view of the portion of the 3D printing system of FIG. 7 according to example implementations.

Referring to FIG. 11, there is shown a sectional view 1100 of the one or more than one example implementation described with reference to FIGS. 7, 8, 9 and 10. The view 1100 shows more clearly the housing 702 containing the spool 1002 mounted on the spindle 1006. It can be appreciated that the pinions 706 are mounted to respective ends of the spindle 1006. The pinions 706 engage respective racks 704 that are mounted either side of the aperture 708.

Figure 12:
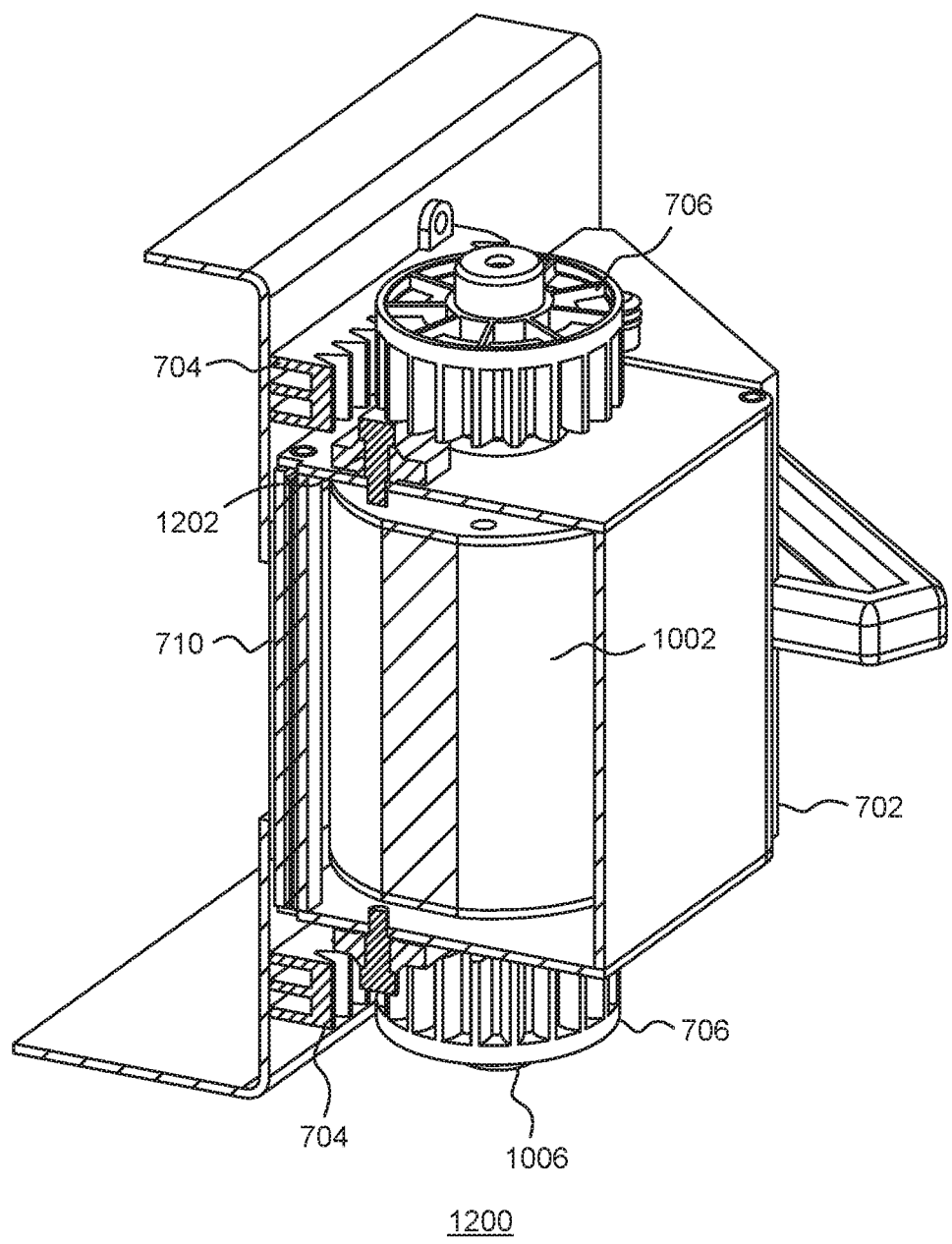
FIG. 12 illustrates a still further sectional view of the portion of the 3D printing system of FIG. 7 according to example implementations.

Referring to FIG. 12, there is shown a view 1200 of the housing 702 bearing the spool 1002 having pinions 706 that engage with respective racks 704. Also shown is a hinge 1202 about which the spindle 1006 can pivot or rotate as the radius of the spool 1002 varies with the spooling or unspooling of the curtain 710.

Figure 13:
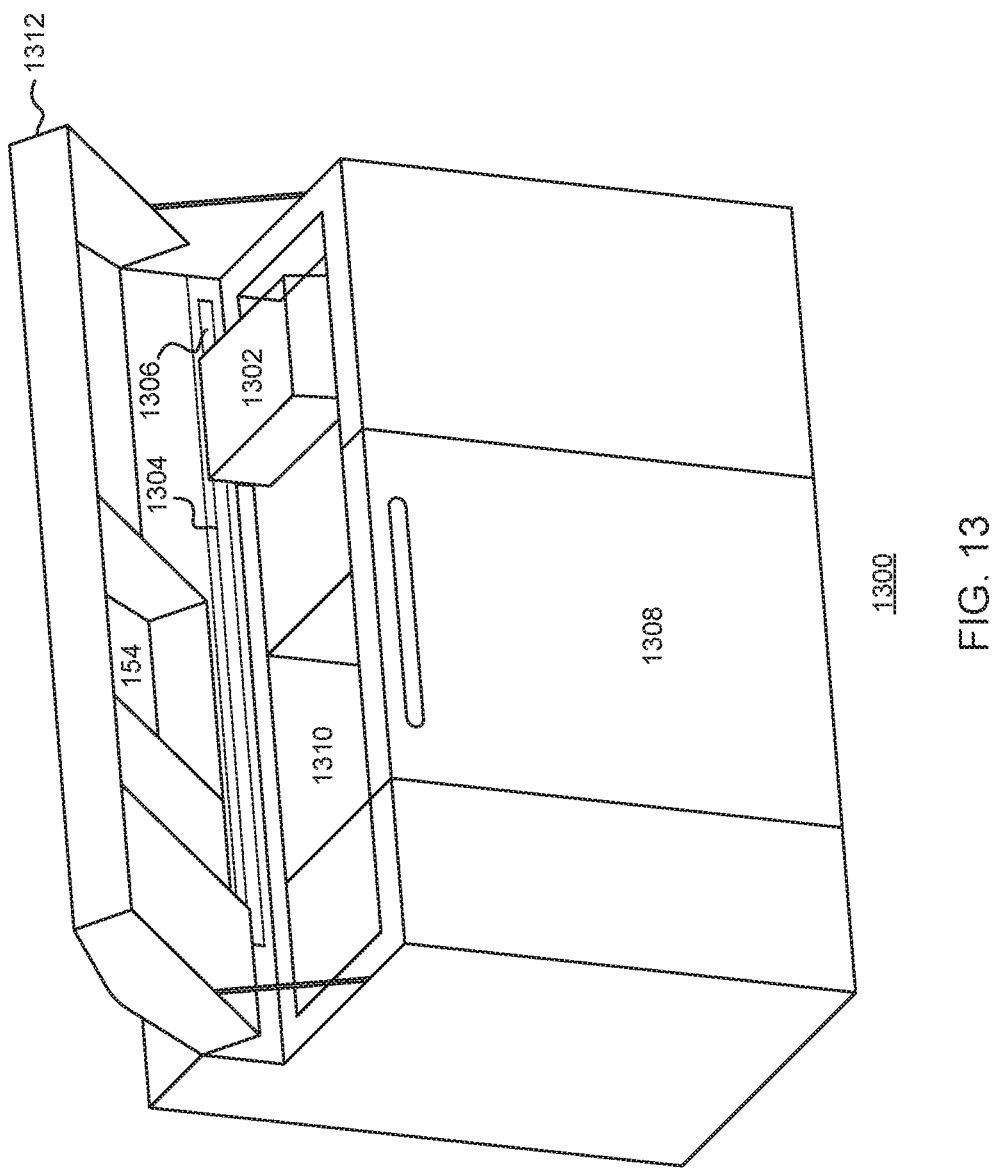
FIG. 13 depicts a schematic view of a 3D printing system according to example implementations.

Referring to FIG. 13, there is shown a view of a 3D printer 1300 having a printer carriage 1302 and curtains 1304 and 1306 disposed either side of the printer carriage 1302. The printer carriage 1302 is an example of the above described printer carriage 202. The curtains 1304 and 1306 are examples of the above described curtains 212 and 214.

The printer 1300 comprises a removable build unit 1308. However, alternatively, the build unit 1308 can be fixed, that is, it can be an integral part of the printer 1300. A build chamber 1310 is also shown. The build chamber is an example of the above described print chamber 216. The printer 1300 comprises a lid 1312. The lid bears a heater such as the above described lamp 154 described above as reference to FIG. 1.

Figure 14:
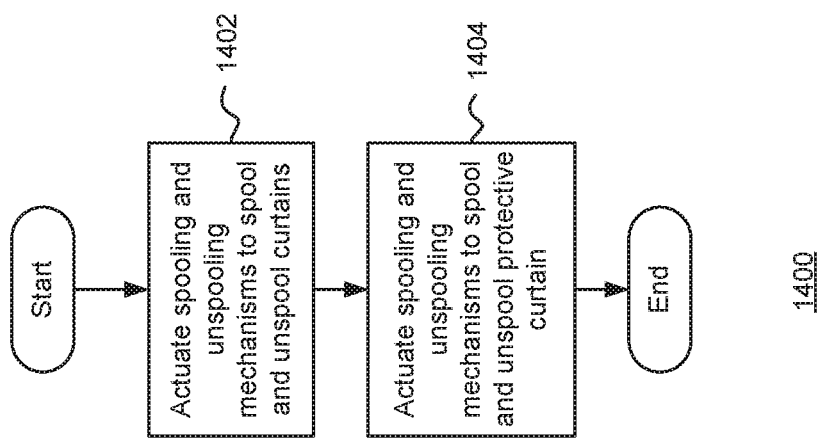
FIG. 14 illustrates a flowchart according to example implementations.

Referring to FIG. 14, there is shown a view 1400 of a flowchart for actuating spooling and unspooling mechanisms according to example implementations. At 1402, the spooling and unspooling mechanisms are actuated to spool and unspool concurrently or in a synchronized manner at least a pair of curtains that provide a sealing relationship with an aperture. The spooling and unspooling mechanisms and the curtains can be any of the spooling and unspooling mechanisms described in this application.

Optionally, at 1404 the spooling and unspooling mechanisms associated with the further curtain or curtains 610 held on a respective spool 612 or on respective spools 612 described above with reference to FIG. 600B can also be actuated to separate and protect the clean side 608 of the curtain 604 from the pollutants. Again, it will be appreciated that the overlapping relationship between a further curtain 610 and a curtain 604 prevents, or at least reduces, powder, particulates or other pollutants 606 on the polluted side of the curtain 604 from coming into contact with the clean side 608 of the curtain 604. The spools 602 and 612 can be arranged to operate synchronously using any of the spooling and unspooling mechanisms described in this application, or any other arrangement for synchronizing the spools 602 and 612.

Although the spooling and unspooling mechanisms have been described as being mechanically coupled to realise or otherwise achieve synchronization, that is, concurrent spooling and unspooling, example implementations can be realised in which the spools have respective motors and motor controllers that can be synchronized under the control of the controller 156 using respective control signals to control starting and stopping of the motors as well as the speed of the motors. It will be appreciated that the angular speed of corresponding spooling and unspooling mechanisms can vary to accommodate the variation in radii of the portions of the curtains held on respective spools. As one spool accumulates curtain, which will increase the radii of the portion of spooled curtain, the other spool unspool curtain, which will decrease the radii of the portion of spooled curtain. It will, therefore, be appreciated that the controller 156 can control the motor controllers to take into account the varying radii, which will assist in maintaining the curtains in a sealing relationship with a respective aperture. Therefore, the spooling and unspooling mechanisms can be actuated passively, that is, in response to movement of a carriage, or actuated actively to accommodate movement of a carriage.

Example implementations of the system 100 can be realised in the form of machine-executable instructions arranged, when executed by a machine, to implement any or all aspects, processes, activities or flowcharts, taken jointly and severally in any and all permutations, described in this application. It will be appreciated that circuitry as used herein can comprise one or more than one of physical electronic circuitry, software, hardware, application specific integrated circuitry or FPGAs, taken jointly or severally in any and all permutations.

Therefore, implementations also provide machine-readable storage storing such machine-executable instructions. The machine-readable storage can comprise transitory or non-transitory machine-readable storage. The machine can comprise one or more processors, or other circuitry, for executing the instructions or implementing the instructions.

Figure 15:
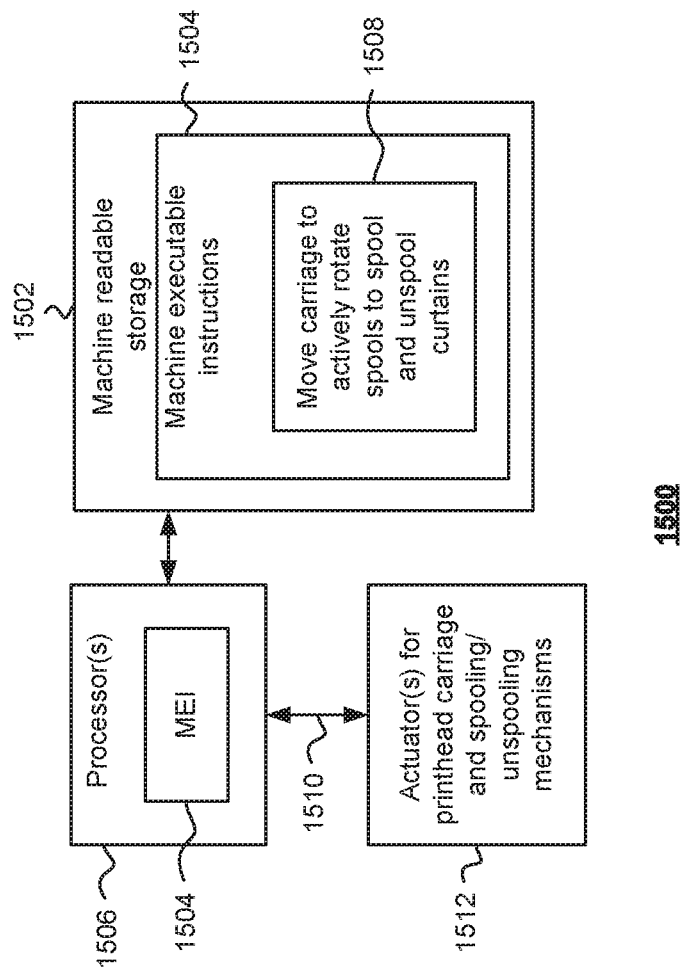
FIG. 15 shows machine-readable storage storing machine-executable instructions according to example implementations.

Accordingly, referring to FIG. 15, there is shown a view 1500 of implementations of at least one of machine-executable instructions or machine-readable storage. FIG. 15 shows machine-readable storage 1502. The machine-readable storage 1502 can be realised using any type of volatile or non-volatile storage such as, for example, memory, a ROM, RAM, EEPROM, or other electrical storage, or magnetic or optical storage or the like. The machine-readable storage 1502 can be transitory or non-transitory. The machine-readable storage 1502 stores machine-executable instructions (MEIs) 1504. The MEIs 1504 comprise instructions that are executable by a processor or other instruction execution, or instruction implementation, circuitry 1506. The processor or other circuitry 1506 is responsive to executing or implementing the MEIs 1504 to perform any and all activities, processes, operations or methods described, illustrated and/or claimed in this application. Example implementations of the MEIs 1504 comprise machine-executable instructions 1508 for moving, via one or more than one control signal 1510 to one or more than one actuator 1512, the printhead carriages described herein, which will also synchronously spool and unspool the curtains to maintain a sealing relationship with the aperture.

The controller 156 can be an implementation of the foregoing processor or other circuitry 1506 for executing any such MEIs 1504.

Although the example implementations have been described with reference to 3D printing, example implementations can be realised that relate to 2D printing.

Further example implementations can be realised according to the following clauses:

Clause 1: A sealing assembly to seal an aperture, coupling two chambers, the aperture being arranged to accommodate a printhead carriage; the assembly comprising: at least a pair of curtains capable of being disposed in a sealing relationship with the aperture; the at least a pair of curtains being capable of being positioned one either side of the printhead carriage, and spooling and unspooling mechanisms comprising a pair of spools onto which the pair of curtains can be spooled and unspooled in response to movement of the printhead carriage to maintain the sealing relationship with the aperture.

Clause 2: The assembly of clause 1, in which the spooling and unspooling mechanisms comprise respective spool drives to rotate the spools synchronously with, or in response to, moving the printhead carriage, or to rotate the spools synchronously with one another.

Clause 3: The assembly of clause 2, in which the respective spool drives comprise at least a frictional coupling between at least one end of the spool drives and an associated camming or drive surface that rotates the respective spools.

Clause 4: The assembly of clause 2, in which the respective spool drives comprise at least respective rack and pinions, the pinions being disposed on the spools; the rack and pinions being arranged to rotate the respective spools in response to the movement of the printhead carriage.

Clause 5: The assembly of clause 2, in which the respective spool drives comprise at least a geared arrangement between the pair of spools to synchronise rotating the spools in response to the movement of the printhead carriage.

Clause 6: The assembly of clause 2, in which the respective spool drives comprise at least a timing belt arranged between the pair of spools to synchronise rotating the spools in response to the movement of the printhead carriage.

Clause 7: The assembly of any preceding clause, comprising a further pair of curtains, each curtain of the further pair of curtains being disposed in an overlapping relationship with a respective curtain of the at least a pair of curtains; the spooling and unspooling mechanisms being capable of concurrently spooling, or unspooling, the curtains in each of the overlapping relationship.

Clause 8: The assembly of clause 7, in which the further curtain of the curtains in the overlapping relationship is arranged to separate, on spooling, opposite sides of a respective curtain of the at least a pair of curtains (thereby separating, or keeping separate, the clean and dirty sides of the first curtain).

Clause 9: The assembly of any preceding clause, in which the pair of spools are moveable in response to spooling and unspooling the curtains to accommodate variations in spooling and unspooling radii.

Clause 10: The assembly of any preceding clause, in which the spooling and unspooling mechanisms further comprise at least one cleaning member for cleaning a respective curtain of the at least a pair of curtains.

Clause 11: The assembly of any preceding clause, in which the spooling and unspooling mechanisms further comprise a biasing member arranged to urge a respective curtain of the at least a pair of curtains into a sealing relationship with a surface bearing the aperture.

Clause 12: The assembly of clause 11, in which the biasing member is arranged to clean a respective curtain of the at least a pair of curtains.

Clause 13: The assembly of any preceding clause, in which the curtain comprises at least one of a metal curtain biased towards a wound state or an unwound state, a plastic curtain, a web, a foil, a net or a fabric.

Clause 14: A 3D printer having a print chamber and a further chamber, the further chamber being arranged to bear air with fewer contaminants relative to contaminants in the print chamber; the 3D printer having a sealing assembly to seal an aperture, coupling the print chamber and the further chamber, the aperture being arranged to accommodate a printhead carriage; the assembly comprising: at least a pair of curtains disposed in a sealing relationship with the aperture; the at least a pair of curtain being positioned one either side of the printhead carriage, and spooling and unspooling mechanisms comprising at least a pair of spools onto which the pair of curtains can be spooled and unspooled in response to movement of the printhead carriage to maintain the sealing relationship with the aperture.

Clause 15: A 3D printer having a sealing assembly of any of clauses 1 to 13.

Clause 16: A method to control a 3D printer having a print chamber and a further chamber, the further chamber being protected from pollutants within print chamber by a sealing assembly arranged to seal an aperture, coupling the print chamber and the further chamber, the aperture being arranged to accommodate a printhead carriage; the method comprising actuating at least one spooling and unspooling mechanisms comprising at least a pair of spools onto which at least a pair of curtains can be spooled and unspooled in response to movement of the printhead carriage to maintain a sealing relationship between said at least a pair of curtains and the aperture.

Clause 17: The method of clause 16, further comprising actuating spooling and unspooling mechanisms associated with a protective curtain that is arranged to protect one side of a curtain of said at least a pair of curtains from pollutants on the other side of said curtain of said at least a pair of curtains.

Clause 18: Machine-readable storage storing machine-executable instructions arranged, when executed, to control a 3D printer having a print chamber and a further chamber, the further chamber being protected from pollutants within print chamber by a sealing assembly arranged to seal an aperture, coupling the print chamber and the further chamber, the aperture being arranged to accommodate a printhead carriage; the machine-executable instructions comprising: instructions for actuating at least one spooling and unspooling mechanisms comprising at least a pair of spools onto which at least a pair of curtains can be spooled and unspooled in response to movement of the printhead carriage to maintain a sealing relationship between said at least a pair of curtains and the aperture.

Clause 19: The machine-readable storage of clause 18, further comprising instructions for actuating spooling and unspooling mechanisms associated with a protective curtain that is arranged to protect one side of a curtain of said at least a pair of curtains from pollutants on the other side of said curtain of said at least a pair of curtains.

The invention claimed is:

1. A sealing assembly comprising:
    a barrier comprised of a pair of sealing curtains positioned to cover and seal an aperture that is arranged to accommodate a printhead carriage, the barrier arranged so that portions of the printhead carriage are placed at separate sides of the barrier, a first curtain in the pair of sealing curtains being positioned on a first side of the printhead carriage and a second curtain in the pair of sealing curtains being positioned on a second side of the printhead carriage that is opposite the first side;
    a primary pair of spools and a secondary pair of spools disposed on the printhead carriage, the first curtain being attached to a first spool in the primary pair of spools and the second curtain being attached to a second spool in the primary pair of spools, the first and second curtains being spooled and unspooled by the first and second spools of the primary pair of spools in response to movement of the printhead carriage;
    a pair of protective curtains attached to the secondary pair of spools, the pair of protective curtains being positioned to overlap with the pair of sealing curtains to reduce particulate pollution on the pair of sealing curtains; and
    a biasing member configured to urge one or more of the first or second curtain in the pair of sealing curtains into a sealing relationship with the aperture.

2. The assembly of claim 1, further comprising a mechanical coupling between the primary pair of spools with a rotating part that rotates to rotate the primary pair of spools synchronously, the primary pair of spools rotating with, or in response to, movement of the printhead carriage.

3. The assembly of claim 2, wherein the mechanical coupling between the primary pair of spools comprises a frictional coupling.

4. The assembly of claim 2, wherein the mechanical coupling between the primary pair of spools comprises a rack and pinions, the pinions being disposed on the primary pair of spools, the rack and pinions being arranged to rotate respective primary spools in response to movement of the printhead carriage.

5. The assembly of claim 2, wherein the mechanical coupling between the primary pair of spools comprises a train of gears arranged between the primary pair of spools to synchronize rotating the primary spools in response to movement of the printhead carriage.

6. The assembly of claim 2, wherein the mechanical coupling between the primary spools comprises a timing belt arranged between the primary pair of spools to synchronize rotating the primary spools in response to movement of the printhead carriage.

7. The assembly of claim 1, wherein the secondary pair of spools is arranged for concurrently spooling or unspooling the pair of protective curtains in an overlapping relationship.

8. The assembly of claim 1, further comprising a pair of guide rollers located at the aperture, each guide roller receiving and guiding one of the first or second curtains of the pair of sealing curtains from the corresponding first or second spool in the primary pair of spools.

9. The assembly of claim 1, in which the primary pair of spools are moveable in response to spooling and unspooling the pair of sealing curtains to accommodate variations in spooling and unspooling radii.

10. The assembly of claim 1, wherein the biasing member comprises a cleaner positioned for cleaning is one or more of the first or second curtains in the pair of sealing curtains.

11. The assembly of claim 1, in which the biasing member is arranged to clean the corresponding curtain or curtains of the pair of sealing curtains.

12. The assembly of claim 1, in which the pair of sealing curtains comprises at least one of:
    a. a metal curtain biased towards a wound state or an unwound state,
    b. a plastic curtain,
    c. a web,
    d. a net,
    e. a fabric, or
    f. a foil.

13. A 3D printer having a sealing assembly comprising:
    a barrier comprised of a pair of sealing curtains positioned to cover and seal an aperture, the barrier arranged so that portions of a printhead carriage are placed at separate sides of the barrier, a first curtain in the pair of sealing curtains being positioned at a first side of the printhead carriage and a second curtain being positioned at a second side the printhead carriage that is opposite the first side;
    spooling and unspooling mechanisms that comprise a primary pair of spools and a secondary pair of spools disposed on the printhead carriage, the first curtain being attached to a first spool in the primary pair of spools and the second curtain being attached to a second spool in the primary pair of spools, the pair of sealing curtains being spooled and unspooled by the primary pair of spools in response to movement of the printhead carriage while maintaining a sealing relationship with the aperture; and a pair of protective curtains attached to the secondary pair of spools, the pair of protective curtains being positioned to overlap with the primary pair of sealing curtains to reduce particulate pollution on the primary pair of sealing curtains.

14. The assembly of claim 3, wherein the frictional coupling between the primary pair of spools comprises a belt.

15. The assembly of claim 10, wherein the cleaner is a biased scraper in contact with the one or more of the first or second curtains in the pair of sealing curtains and that is configured to urge the corresponding curtain or curtains to seal the aperture while removing contaminants from the corresponding curtain or curtains.

16. The 3D printer of claim 13, wherein the printhead carriage comprises:
   a plurality of printheads; and
   a drive;
   wherein the plurality of printheads are on an opposite side of the curtains from the drive.

17. A sealing assembly comprising:
   a barrier comprised of a pair of sealing curtains positioned to cover and seal an aperture, the barrier arranged so that portions of a printhead carriage are placed at separate sides of the barrier, a first curtain in the pair of sealing curtains being positioned on a first side of the printhead carriage and a second curtain in the pair of sealing curtains being positioned on a second side of the printhead carriage that is opposite the first side;
   a primary pair of spools and a secondary pair of spools disposed on the opposite sides of the printhead carriage, the first curtain being attached to a first spool in the primary pair of spools and the second curtain being attached to a second spool in the primary pair of spools, the first and second curtains being spooled and unspooled by the first and second spools of the primary spools in response to movement of the printhead carriage to maintain a sealing relationship with the aperture;
   a pair of protective curtains attached to the secondary pair of spools, the pair of protective curtains being positioned to overlap with the primary pair of sealing curtains to reduce particulate pollution on the primary pair of sealing curtains; and
   a rotating mechanical coupling that extends between the primary pair of spools to mechanically couple, and rotate with, the primary pair of spools to synchronize rotation of the primary pair of spools that occurs with, or in response to, movement of the printhead carriage.

* * * * *